United States Patent [19]

Kasahara et al.

[11] Patent Number: 5,270,024
[45] Date of Patent: Dec. 14, 1993

[54] PROCESS FOR REDUCING NITROGEN OXIDES FROM EXHAUST GAS

[75] Inventors: Senshi Kasahara, Shinnanyo; Katsumi Kamiyama, Tokuyama; Kazushige Igawa, Shinnanyo; Shinichi Matsumoto, Aichi; Masayuki Fukui, Toyoake; Tadashi Suzuki, Nagoya; Shiroh Kondoh, Aichi; Koji Yokota, Nagoya; Shinichi Takeshima, Susono; Kazunobu Ishibashi, Toyota; Masao Nakano, Hikari, all of Japan

[73] Assignees: Tosoh Corporation, Shinnanyo; Kabushiki Kaisha Toyota Chuo Kenkyusho, Aichi; Toyota Jidosha Kabushiki Kaisha, Toyota, all of Japan

[21] Appl. No.: 575,621

[22] Filed: Aug. 31, 1990

[30] Foreign Application Priority Data

| Aug. 31, 1989 [JP] | Japan | 1-225796 |
| Oct. 16, 1989 [JP] | Japan | 1-269637 |
| Oct. 23, 1989 [JP] | Japan | 1-275369 |
| Dec. 27, 1989 [JP] | Japan | 1-340530 |

[51] Int. Cl.$^5$ ............... B01J 8/06; B01D 53/36
[52] U.S. Cl. ............... 423/213.2; 423/213.5; 423/239.2; 423/247
[58] Field of Search ............... 502/77, 78, 79, 73; 423/213.2, 239, 247, 213.5

[56] References Cited

U.S. PATENT DOCUMENTS

| 3,177,152 | 4/1965 | Kearby | 502/74 |
| 3,346,328 | 10/1967 | Jergeys et al. | 423/213.2 |
| 3,883,445 | 5/1975 | Roth et al. | 423/213.2 |
| 4,178,269 | 12/1979 | Murtha | 252/441 |
| 4,297,328 | 10/1981 | Rischer et al. | 423/213.2 |
| 4,331,644 | 5/1982 | Rischer | 423/437 |
| 4,473,535 | 9/1984 | Kittrell et al. | 423/213.2 |
| 4,798,813 | 1/1989 | Kato et al. | 502/78 |
| 5,041,272 | 8/1991 | Tamura et al. | 423/239 |
| 5,116,586 | 5/1992 | Baacke et al. | 423/239 |

FOREIGN PATENT DOCUMENTS

| 0286967 | 10/1988 | European Pat. Off. . |
| 0311066 | 4/1989 | European Pat. Off. . |
| 0362966 | 4/1990 | European Pat. Off. . |
| 0365308 | 4/1990 | European Pat. Off. . |
| 373665 | 6/1990 | European Pat. Off. . |
| 3735151 | 4/1988 | Fed. Rep. of Germany ... 423/213.2 |
| 9049866 | 5/1974 | Japan | 423/239 |
| 42489 | 4/1977 | Japan | 502/73 |
| 60-125250 | 7/1985 | Japan . |
| 2114657 | 5/1987 | Japan | 502/78 |
| 63-100919 | 5/1988 | Japan . |
| 3119850 | 5/1988 | Japan | 423/247 |
| 63-283727 | 11/1988 | Japan . |
| 7312848 | 6/1974 | Netherlands | 423/239 |
| 521007 | 8/1978 | U.S.S.R. | 502/73 |

*Primary Examiner*—1
*Assistant Examiner*—Carl F. Dees
*Attorney, Agent, or Firm*—Oblon, Spivak, McClelland, Maier & Neustadt

[57] ABSTRACT

A catalyst for reducing nitrogen oxides from an exhaust gas containing the same in an oxygen rich atmosphere comprising (i) a zeolite having a molar ratio of $SiO_2/Al_2O_3$ of at least 10, (ii) copper, and (iii) a rare earth ion, an alkaline earth metal and/or a valence variable metal.

13 Claims, 1 Drawing Sheet

PROCESS FOR REDUCING NITROGEN OXIDES FROM EXHAUST GAS

BACKGROUND OF THE INVENTION

1. Field of the Invention

The present invention relates to a catalyst for reducing nitrogen oxides from a gas containing the same, such as gases exhausted from internal combustion engines (e.g., automobile engines) and those exhausted from industrial plants (e.g., nitric acid production plants). More specifically it relates to a catalyst for reducing nitrogen oxides as well as carbon monoxide and hydrocarbons from the above-mentioned exhaust gases in an oxygen rich atmosphere and a method of reducing nitrogen oxides as well as carbon monoxide and hydrocarbons from the above-mentioned exhaust gases in an oxygen rich atmosphere.

The term "an oxygen rich atmosphere" used herein means an atmosphere having an oxygen content larger than that of a theoretical air-fuel ratio.

2. Description of the Related Art

Over many years the harmful components of nitrogen oxides (NOx) contained in exhausted gases have been exhausted from internal combustion engines such as those used by, for example, automobiles, and from, for example, nitric acid production plants, to cause atmospheric pollution, and accordingly, various methods of reducing nitrogen oxides from such exhausted gases have been investigated.

Further, a diluted combustion has been considered, to lower the fuel costs of automobiles. In this case, the air to fuel ratio is made an oxygen rich atmosphere on the lean side, whereby drawbacks have occurred in that the three-way catalyst having noble metals (e.g., Pt, Rh, Pd), loaded on a carrier such as $Al_2O_3$, as used in the prior art, can not eliminate NOx emissions, although HC and CO, among the harmful components in the exhausted gas, are removed. A known catalyst which solves this problem is a copper (Cu)-containing zeolite (Japanese Unexamined Patent Publication (Kokai) No. 63-283727). The basic principle for removing NOx in an oxygen rich atmosphere with a Cu-containing zeolite catalyst resides in adsorbing NOx with the Cu and effecting a catalytic reaction of the adsorbed NOx with the reducible uncombusted hydrocarbons contained in the exhausted gas, to reduce the NOx to $N_2$. This catalyst exhibits a NOx conversion ability at 200° C. or higher, but has the problems described below.

The Cu-containing zeolite catalyst has an excellent initial catalytic activity, since Cu has a high NOx adsorption ability, but a problem arises therewith of durability, particularly durability at high temperatures. Accordingly, the development of a catalyst having a high catalytic activity even after prolonged usage is required. The cause of the inferior durability of this catalyst is the migration and agglomeration of the copper in the zeolite at a temperature of 600° C. or higher, whereby the catalyst activity is lowered, and further, because the stability of the zeolite structure is lowered by containing Cu therein, and the structure thereof is destroyed after prolonged usage. Also, since the above-mentioned catalyst cannot reduce NOx at 200° C. or lower, there is a problem in that NOx cannot be reduced at 200° C. or lower. This is because NOx exists as $NO_2$ under an oxygen rich condition of 200° C. or lower, but the Cu-containing zeolite cannot convert $NO_2$ to $N_2$.

SUMMARY OF THE INVENTION

Accordingly, the objects of the present invention are to eliminate the above-mentioned disadvantages of the prior art and to provide a novel catalyst for reducing NOx, as well as CO and HC, which catalyst has a higher conversion ability than the catalyst of the prior art in a broad temperature region of 800° C. or lower under an oxygen rich atmosphere, without using a reducing agent such as ammonia, and has a good durability (or service life) with no significant lowering of the catalytic activity thereof even when used for a long time.

Other objects and advantages of the present invention will be apparent from the following description.

In accordance with the present invention, there is provided a catalyst for reducing nitrogen oxides, carbon monoxide, and hydrocarbons from an exhaust gas containing the same in an oxygen rich atmosphere comprising (i) a zeolite having a mole ratio of $SiO_2/Al_2O_3$ of at least 10 and (ii) at least one copper ion and at least one kind of rare earth ion contained therein.

In accordance with the present invention, there is also provided a catalyst for reducing nitrogen oxides from an exhaust gas containing the same in the presence of an organic compound in an oxygen rich atmosphere, comprising (i) a zeolite and (ii) copper and at least one kind of alkaline earth metal loaded thereon.

In accordance with the present invention, there is further provided catalyst for reducing nitrogen oxides from an exhaust gas containing the same in the presence of an organic compound in an oxygen rich atmosphere, comprising (i) a zeolite, (ii) copper and at least one kind of alkaline earth metal loaded on the zeolite, and (iii) at least one kind of rare earth ion loaded on the zeolite.

In accordance with the present invention, there is still further provided a catalyst for reducing nitrogen oxides from an exhaust gas containing the same in the presence of an organic compound in an oxygen rich atmosphere, comprising (i) a zeolite and (ii) copper and at least one kind of valence variable metal loaded thereon.

BRIEF DESCRIPTION OF THE DRAWINGS

The present invention will be better understood from the description set forth below with reference to the accompanying drawing of FIG. 1, which is a graph showing the relationships of the NOx conversion versus the temperature of the catalyst No. 2—2 of the Example and Comparative Example catalyst No. C2-1.

DESCRIPTION OF THE PREFERRED EMBODIMENTS

Figure 1:
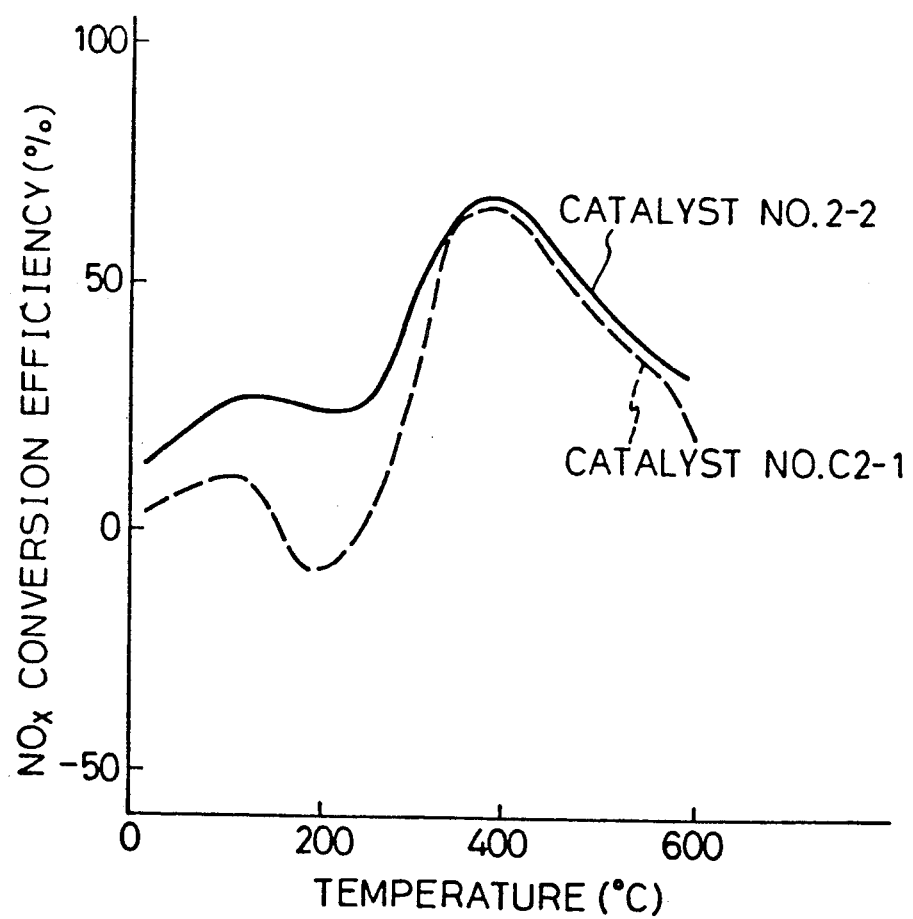

The zeolite usable in the present invention has a general composition of:

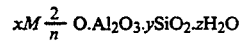

wherein n is a valence of a cation M, x is a number of from 0.8 to 2, y is a number of 2 or more, and z is a number of 0 or more. That is, the zeolite is constituted of a tetrahedral network structure of $SiO_2$ and $Al_2O_3$, and the individual tetrahedral structures are bonded at the corners thereof by a crosslinking with oxygen, to thereby form a network structure through which channels and cages are extended, and at the ion exchangeable site (strong acid site) having a negative lattice charge, an exchangeable cation (H+, Na+, etc.) is introduced.

The zeolite usable in the present invention generally has a molar ratio of $SiO_2/Al_2O_3$ of 10 or more, preferably 10 to 200. When the $SiO_2/Al_2O_3$ mole ratio is less than 10, due to a low heat resistance and durability of the zeolite itself, a required heat resistance and durability of the catalyst cannot be obtained.

The zeolite constituting the catalyst of the present invention may be a natural or a synthetic product, and the methods of preparation of these zeolites are not particularly limited. Nevertheless, representative examples of zeolites to be used include mordenite, ferrierite, ZSM-5, ZSM-11, ZSM-12, and ZSM-20. Also, zeolites II such as Y type zeolite and L type zeolite subjected to dealumination may be employed. Also, these zeolites can be used as such or treated with an ammonium salt and a mineral acid to be ion exchanged to form $NH_4^+$ or $H^+$ before use as the catalyst of the present invention.

Also, preferably the zeolite is one having $NH_4^+$ and $H^+$ readily exchangeable with Cu ion site. Also, the micro-pores on the zeolite surface are preferably as small as 10 Å or less. By making the size of the micropores such that polycyclic aromatic hydrocarbons cannot enter therein, coke will be formed with difficulty, and the structural destruction and lowering of the catalytic activity due to the clogging of micro-pore can be prevented.

As the representative exhausted gas purification catalyst of the first embodiment of the present invention, zeolites with a molar ratio of $SiO_2/Al_2O_3$ having at least 10 and containing copper ion and a rare earth ion incorporated by ion exchange therein are exemplified.

As the method of incorporating copper ion and a rare earth ion in the above-mentioned zeolite, the ion exchange method is included. The method is not particularly limited, but generally practiced ion exchange methods can be employed. A representative example is the method in which an ion exchange is effected by using a mixed aqueous solution containing copper and a rare earth ion, or an ion exchange of the rare earth ion may be effected after an ion exchange of copper ions. Alternatively, an ion exchange of the copper ions may be effected after an ion exchange of a rare earth ion.

The concentrations of copper and a rare earth ion during the ion exchange can be set as desired, depending on the intended degree of ion exchange.

In the above description, during the copper ion exchange, to increase the copper ion content, ammonia may be added to adjust the pH. Since the copper ions existing at the ion-exchangeable sites are active sites, preferably the copper is ion exchanged at those ion-exchangeable sites.

For the rare earth ion, if the pH is increased by an addition of ammonia, the rare earth ion will be precipitated as hydroxide, and it becomes difficult to effect the ion exchange, and therefore, preferably ammonia is not added. Also, the rare earth ion is preferably ion-exchanged at the ion-exchangeable site, but the effect thereof can be also exhibited when loaded as an oxide on the zeolite, by a calcination of the hydroxide precipitated on the zeolite surface.

The sample after ion-exchange is subjected to solid-liquid separation, washing and drying before use as the catalyst, and if necessary, it can be calcined before use.

The degree of ion-exchange of copper is preferably within the range of from 0.01 to 1, more preferably from 0.1 to 0.6 as represented by the Cu/Al atomic ratio. When the Cu/Al atomic ratio is less than 0.01, copper ions which are active sites become smaller, and thus a required catalytic activity cannot be obtained. Conversely when the ratio exceeds 1, excess copper will exist in an agglomerated state on the zeolite surface, whereby an adverse influence may be exerted on the catalytic activity, heat resistance, and durability.

The degree of ion-exchange amount of the rare earth ion is preferably 0.01 or more, more preferably 0.01 to 2, in terms of (rare earth ion)/Al atomic ratio. When the (rare earth ion)/Al atomic ratio is less than 0.01, the effect of the co-presence of the rare earth ion is small, and thus a satisfactory catalyst performance and durability cannot be obtained.

The $SiO_2/Al_2O_3$ molar ratio of the exhausted gas purification catalyst of the present invention is not substantially different from the $SiO_2/Al_2O_3$ molar ratio of the zeolite substrate employed. Also, the crystal-structure of the exhausted gas cleaning catalyst will be the same before and after the ion exchange.

The exhaust gas purification catalyst of the present invention can be also used by mixing and molding together with a binder such as a clay mineral, and the zeolite can be previously molded and copper and a rare earth ion incorporated by an ion exchange in the molded product. Examples of the binder used during the molding of zeolite include clay minerals such as kaolin, atapalgite, montmorillonite, bentonite, allophen, and sepiorite. Alternatively, a binderless zeolite obtained by a direct synthesis of a molding may be employed. Further, a zeolite can be also used by wash coating same onto a honeycomb-shaped substrate made of cordierite or a metal.

Nitrogen oxides, carbon monoxide and hydrocarbons in an oxygen rich exhausted gas can be reduced by bringing the exhausted gas cleaning catalyst of the present invention into contact with the oxygen rich exhausted gas containing nitrogen oxides, carbon monoxide and hydrocarbons. The oxygen rich exhausted gas to be treated by the present invention refers to an exhausted gas containing a larger amount of oxygen than is necessary for a complete oxidation of carbon monoxide, hydrocarbons and hydrogen contained in the exhausted gas, and specific examples of such an exhausted gas include gases exhausted from internal combustion engines such as those used in automobiles, etc., particularly exhausted gases having a high air to fuel ratio (i.e., lean region).

The above-described exhausted gas catalyst can also exhibit a catalytic performance equal to that of the zeolite catalyst of the prior art having copper loaded thereon, when applied to an exhausted gas containing carbon monoxide, hydrocarbons and hydrogen which is not in oxygen rich.

As described above, in the exhausted gas under a non-co-presence of a reducing agent, nitrogen oxides are decomposed into oxygen and nitrogen through a redox reaction of the copper ions exchanged into the zeolite.

On the other hand, in the gas exhausted from internal combustion engines where oxygen is co-present, nitrogen oxides are reduced on the base metals in the zeolite with hydrocarbons and carbon monoxide existing in minute amounts in the exhausted gas, and oxygen-containing organic compounds formed by a partial oxidation. In this case, at the base metal, copper ions exhibit the best catalyst performance. Copper ions, not at the ion-exchangeable sites but when loaded as oxides on the zeolite, or when the copper is agglomerated, have a low adsorption capacity of nitrogen oxides, and when exposed to high temperatures, tend to promote a release of the Cu ions loaded at the ion-exchangeable sites, and therefore, preferably are loaded at the ion-exchangeable sites, to ensure a required catalytic performance and durability.

The catalyst of the present invention has copper ions and a rare earth ion co-present on a zeolite as described above, and the effects obtained by the co-presence of copper ions and a rare earth ion may be considered to be as follows.

1) The heat resistance and durability of the zeolite itself are improved.

2) By permitting rare earth ions to be interposed between the copper ions in the zeolite, the migration and agglomeration of copper ions are prevented.

3) Due to the weak acid site of rare earth element ions, the formation of coke is prevented, and various hydrocarbons contained in the exhausted gas are converted to lower olefins and oxygen-containing compounds.

The copper ions ion-exchanged into the zeolite will be released from the ion-exchangeable sites when treated at a high temperature, to be diffused and agglomerated within micro-pores or toward the zeolite surface, whereby the reaction between the nitrogen oxides and the reducing components in the exhausted gas will be hindered. In contrast, by permitting rare earth ions to be co-present with copper ions, the migration and agglomeration of copper ions can be prevented to thereby improve the durability of the catalyst.

Also, various hydrocarbons are contained in the gases exhausted from internal combustion engines. The hydrocarbons effective for reducing nitrogen oxides are lower olefins and oxygen containing organic compounds; paraffins and aromatic compounds have a lower reducing ability of nitrogen oxides. In such a case, in the catalyst of the present invention the rare earth ions form weak acid sites in the zeolite, thereby providing the effect that hydrocarbons having a lower reactivity, such as paraffins, can be converted to lower olefins and oxygen-containing organic compounds having a higher reactivity. Accordingly, due to the reaction of the converted lower olefins and nitrogen oxides on the copper ions, hydrocarbons and nitrogen oxides can be removed at the same time, to thereby improve the catalytic activity.

Also, the weak acid sites formed by the rare earth ions suppress the formation of coke, to thereby improve the durability of the catalyst.

The exhausted gas reducing catalyst of the present invention enables the removal of nitrogen oxides, carbon monoxides, and hydrocarbons, at the same time, from an oxygen rich exhausted gas, and exhibits a very high heat resistance and durability. Therefore, by bringing the catalyst of the present invention into contact with an exhausted gas, even under an oxygen rich state, nitrogen oxides, carbon monoxide and hydrocarbons in the gas can be reduced.

The catalyst for purifying exhausted gas catalyst according to the second embodiment of the present invention is a catalyst for reducing nitrogen oxides from an exhausted gas in an oxygen rich atmosphere in the presence of organic compounds or hydrocarbons, and comprises Cu and an alkaline earth metal, a rare earth ion, an alkaline earth metal, and/or a valence variable metal, contained in a zeolite support, and thus has a better NOx reducing ability than the zeolite catalyst having only Cu contained therein under an oxygen rich atmosphere. Cu has an ability to selectively adsorb NOx, and has a better NOx adsorbing ability than other elements. On the other hand, an alkaline earth metal itself adsorbs NO and $NO_2$ and has a catalytic activity, whereby a superior effect can be exhibited by both Cu and an alkaline earth metal in combination. The reaction whereby the catalyst according to the present invention exhibits a superior effect has not been clarified, but it is considered that NO is adsorbed by Cu, and NO and $NO_2$ by the alkaline earth metal, and the NO and the like are immediately subjected to a catalytic reaction with the organic compounds (or hydrocarbons) in the exhausted gas, to be thereby reduced to harmless $N_2$. The reaction at this time is considered to be as follows:

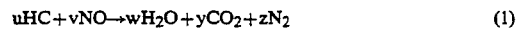

$$uHC + vNO \rightarrow wH_2O + yCO_2 + zN_2 \qquad (1)$$

Also, this catalyst exhibits a very high durability even at a high temperature of 800° C. Usually, Cu ions are reduced at a temperature of 600° to 800° C. and disadvantageously migrated and agglomerated on the zeolite, to thereby lower the durability thereof. In the present catalyst, by permitting alkaline earth metal ions, which are hard to be reduced to metals even at a high temperature and are moved only with difficulty, to exist between Cu ions, the movement of Cu when reduced to metal is prevented, and thus any lowering of the catalytic activity is prevented and the durability is improved.

Also, the strong acid site, which is the ion-exchangeable site in the zeolite, becomes a cause of a coke formation in which a large number of graphites formed by a decomposition of organic compounds are bonded together. This may also lead to micro-pore clogging by the coke, and thus to the eventual destruction of the structure of the zeolite. Since the alkaline earth metal extinguishes superfluous strong acid sites participating in the coke formation, among the adsorption sites of hydrocarbons, it can prevent coke formation and thereby, prevent a deterioration of the catalyst.

Also, the catalyst according to the present invention has an ability to reduce nitrogen oxides at 200° C. or lower. Nitrogen oxides exist as $NO_2$ at 200° C. or lower, and neither Cu nor the alkaline earth metal have the ability to convert reduce $NO_2$ to $N_2$, but since the alkaline earth metal can adsorb $NO_2$ at 200° C. or lower, $NO_2$ can be reduced from the exhausted gas. The adsorbed $NO_2$ will be spontaneously decomposed into NO and $O_2$ at 200° C. or higher, and thus NO can be reduced to $NO_2$ by the catalytic ability of Cu and the alkaline earth metal.

The degree of Cu loaded is preferably 5 to 80% by atom, based on Al atoms in the zeolite. When smaller than 5%, a satisfactory catalyst effect can not be obtained. The catalytic performance will be improved when the degree of Cu contained is increased, but when 80% or more of Cu is contained, the Cu will be susceptible to deterioration due to migration and agglomeration, and the alkaline earth metal will be difficult to load.

At least one kind of the alkaline earth metal is loaded, and the alkaline earth metal is preferably magnesium (Mg), calcium (Ca), strontium (Sr), or barium (Ba). The content is 0.1 to 10% by weight based on the zeolite. The required effect can be exhibited from 0.1% by weight, but to obtain a desired effect, 0.3% by weight or more is preferable. When the content exceeds 10%, however, the acid sites necessary for the reaction will be reduced, and thus the reaction between NO and hydrocarbons will proceed only with difficulty.

When the content of the alkaline earth metal carried is increased, generally the optimum temperature of which NOx can be reduced is shifted to a higher temperature, and therefore, it is necessary to increase or decrease the content depending on the catalyst use conditions.

The Cu is loaded according to the ion exchange method. Namely, an ion exchange is effected through an exchange of $H^+$ or $NH_4^+$ introduced at ion exchange sites having a negative charge in the lattices of the zeolite, with Cu ions. Cu ions are employed in the form of a soluble salt, and as the soluble salt, an acetate, nitrate, formate or copper ammine complex can be employed. The Cu ion exchange is facilitated if the ion exchange is effected in a solution made slightly basic by an addition of ammonia. The pH of the solution is preferably from 9 to 12, because the ratio of cations of Cu relative to the total cations is high.

The alkaline earth metal may be loaded by either the ion exchange method or the impregnation method, and for both the ion exchange method and the impregnation method, an acetate or nitrate of the alkaline earth metal may be employed. An example of the ion exchange method, which is the same as in the case of Cu, comprises the ion exchange step of immersing a zeolite in the solution of the above salt for one day and night, the drying step of heating the zeolite at a temperature of 100° to 120° C. for about 10 hours, and the calcination step of holding the product at a temperature of 300° to 700° C. for several hours. An example of the impregnation method comprises immersing the zeolite in an aqueous solution of the above salt for 1 to 2 hours, then drying in atmosphere to make the salt loaded thereon. The adhesive force is stronger when loaded according to the ion exchange method.

The order in which Cu and the alkaline earth metal are introduced is not limited, but since Ba and Sr can be easily substituted with the loaded Cu, preferably they are introduced prior to the Cu.

The catalyst having Cu and the alkaline earth metal contained therein according to the present invention may have any shape or structure, such as powder, pellets or honeycomb shape, etc.

Also, a binder such as alumina sol or silica sol may be added to a powdery catalyst, and the mixture molded to a desired shape, or formed into a slurry with an addition of water, which may be in turn coated onto a refractory substrate of alumina, etc., having a honeycomb shape.

The catalyst according to the present invention reduces an exhausted gas through a reaction of NOx in the discharged gas with organic compounds, i.e., noncombusted hydrocarbons or oxygen containing organic compounds formed by a partial oxidation.

Preferably, these hydrocarbons are those remaining in the exhausted gas, but when the amount thereof is lower than that necessary for carrying out the reaction, preferably the hydrocarbons are added to the exhausted gas from an external source.

According to the third embodiment of the present invention, the catalyst has Cu, an alkaline earth metal and a rare earth ion loaded in combination on a zeolite, and thus has a better NOx reducing ability than the zeolite catalyst having Cu loaded thereon of the prior art, under an oxygen rich atmosphere. Cu has an ability to selectively adsorb NOx, and has a better NOx adsorbing ability than other elements. On the other hand, an alkaline earth metal itself adsorbs NO and $NO_2$, and has a catalytic activity. The present invention further adds a rare earth ion, and the rare earth ion itself adsorbs NO and $NO_2$, and has a NO reducing activity, whereby an excellent performance can be exhibited by the Cu, an alkaline earth metal and a rare earth ion in concert.

The reaction when the catalyst according to the present invention exhibits an excellent effect has not been clarified, but it is considered that NO is adsorbed on Cu, and NO and $NO_2$ on the alkaline earth metal, and the NO, etc., are immediately subjected to a catalytic reaction with the organic compounds in the exhausted gas, to be thereby reduced to harmless $N_2$.

In the case of the third embodiment of the present invention, in addition to the alkaline earth metal in the case of the second embodiment of the present invention, the rare earth ion also prevents the agglomeration of Cu, to thereby prevent a lowering of the catalytic activity and improve the durability of the catalyst.

The degree of Cu contained is preferably 5 to 80% by atom based on Al atoms in the zeolite. When smaller than 5%, a required catalytic effect can not be obtained. The catalytic performance will be improved as the degree of Cu contained becomes larger, but when 80% or more is loaded, the Cu is susceptible to deterioration due to migration and agglomeration, and the alkaline earth metal and the rare earth element are leaded with difficulty.

At least one kind of the rare earth ion is loaded, and as the rare earth ion, La, Ce, Nd, Y, Pr, and Sm are preferable. The content is made 0.1 to 10% in terms of weight ratio relative to the zeolite. The effect can be exhibited from 0.1% by weight, but 0.3% by weight or more is preferable for obtaining a required effect. When it exceeds 10%, however, the acid sites necessary for the reaction will be reduced and thus, the reaction between NO and hydrocarbons can proceed only with difficulty.

When the content of the rare earth ion carried is increased, generally the optimum temperature at which NOx can be reduced will be shifted to a higher temperature, and therefore, it is necessary to increase the content depending on the catalyst use conditions.

At least one kind of the alkaline earth metal is loaded, and Mg, Ca, Sr, and Ba are preferred. The above-mentioned alkaline earth metal extinguishes unnecessary acid sites participating in the coke formation, which becomes a cause of a lowering of the activity, thereby having the action of preventing a dealumination from the zeolite.

The content of the alkaline earth metal is preferably 0.05 to 2% in terms of weight ratio relative to the zeolite. To obtain a required effect, 0.1% by weight or more is preferable, but when the content exceeds 2% by weight, there will be no further improvement of the catalytic activity.

The Cu, the alkaline earth metal, and the rare earth ion are loaded according to the ion exchange method or the impregnation method, and the ion exchange method and the impregnation method are carried out by using acetates or nitrates of the Cu, alkaline earth metals and rare earth ions. The order in which they are loaded can be disregarded in both methods. Also, these metals can be loaded at the same time. Both the ion exchange method and the impregnation method may be those conventionally practiced. For example, in the case of the ion exchange method, an ion exchange is effected through exchange of H+ or Na+ introduced at the ion-exchangeable sites having negative charge at the lattices of the zeolite with ions of Cu, a rare earth ion, and an alkaline earth metal. The ion exchange method is carried out according to the steps described below, and comprises the ion exchange step of dipping zeolite in aqueous solutions of acetates or nitrates of Cu, rare earth ion, and alkaline earth metal for 24 to 48 hours, the drying step of heating the solid by filtration at 100° to 120° C. for about 10 hours, and the calcination step of maintaining the dried product at a temperature of 500° to 700° C. for several hours. In the impregnation method, the zeolite is dipped in an aqueous solution of the above-mentioned salts for 1 to 2 hours, followed by drying in air, to load the metals on the zeolite. The ion exchange method has ions of Cu, rare earth ion and alkaline earth metal exchanged with the cations within the zeolite, and the adhesive forces of the Cu, rare earth ion and alkaline earth metal are strong.

The ion exchange can be readily effected if performed in an aqueous solution made slightly basic by addition of ammonia. Also, the pH of the solution is preferably within 9 to 12.

The catalyst having Cu, the alkaline earth metal and the rare earth ion loaded thereon according to the third embodiment of the present invention may have any shape or structure, such as powder, pellets or a honeycomb shape.

Also, a binder such as alumina sol and silica sol may be added to the powdery catalyst, and the mixture molded into a desired shape, or formed into a slurry with an addition of water, which may be in turn coated onto a refractory substrate of alumina and shaped as a honeycomb.

The catalyst according to the present invention reduces an exhausted gas through the reaction of NOx in the exhausted gas with organic compounds, namely noncombusted hydrocarbons or oxygen-containing organic compounds formed by a partial oxidation.

The hydrocarbons used may be those remaining in the exhausted gas, but when the amount thereof is less than that necessary for carrying out the reaction, it is preferable to add hydrocarbons to the exhausted gas from an external source.

The catalyst according to the fourth embodiment of the present invention has Cu and a valence variable metal loaded in combination on a zeolite, and thus has a better NOx removing ability than the zeolite catalyst having only Cu loaded thereon in an oxygen rich atmosphere. Cu has an ability to selectively adsorb NOx, and has a better NOx adsorbing ability than other elements. Therefore, most of the NOx is selectively adsorbed onto Cu loaded, by an ion exchange, within zeolite fine pores. On the other hand, organic compounds are selectively adsorbed on the acid sites in the zeolite and converted by the valence variable metal to active organic compounds, which in turn undergo a catalytic reaction with the NOx activated on the Cu, to convert the NOx to harmless $N_2$.

As in the case of the second and third embodiments of the present invention, the valence variable metal the catalyst according to this embodiment of the present invention can decompose NOx directly into nitrogen and oxygen, but for this reaction water and oxygen are contained in the environment in the present invention, and thus substantially no decomposition of NO occurs, and therefore, an improvement can not be effected in practice, compared with the zeolite catalyst of the prior art having only Cu loaded thereon. The present catalyst, as described above, has a specific feature of reducing NOx by a reduction in the co-presence of organic compounds. Also, the water and oxygen existing in the exhausted gas have the effect of promoting the above reaction, contrary to the case of an NO decomposition reaction. Also, the catalyst exhibits a very good durability even at a high temperature of 800° C.

The deterioration of the zeolite catalyst having only Cu loaded thereon is due to an inferior adsorption ability of the oxygen of the catalyst itself, whereby or reducing atmosphere is created within micro-pores in the zeolite, and thus the Cu ions are reduced to be metallized, migrated and agglomerated on the zeolite, to lower the durability thereof. The present invention, by permitting metal ions having ions of a valence variable metal to be co-present, which inhibit a valence change of Cu through their own valence varying action, to stabilize Cu ions and thereby prevent metallization. Also, a valence variable metal ions have a stronger affinity with oxygen, and therefore, are bonded to the oxygen constituting the wall of zeolite micro-pores to exist between Cu ions, whereby the migration of Cu ions can be inhibited, to prevent an agglomeration of Cu.

Further, the organic compounds which can be utilized for the reaction as described above must be absorbed onto the acid sites existing within the micropores of the zeolite, and in the prior art, aromatic compounds with large molecular sizes such as alkylbenzene or branched paraffins and aromatic hydrocarbons can not be utilized.

Nevertheless, by introducing valence variable metals outside of the micro-pores, due to the strong partial oxidation action of these metals on organic compounds, the organic compounds are made active. More specifically, paraffinic organic compounds are converted through an oxidative dehydrogenation reaction, oxidative cleavage reaction, or oxygen addition to lower olefins or oxygen-containing compounds, and aromatic compounds can be subjected to ring opening by a partial oxidation or given a lower molecular weight by a cleavage of a substituent.

Also, the strong acid site which is the ion-exchargeable site in the zeolite is a cause of a coke formation in which a large number of graphites formed by a decomposition of organic compounds are bonded together, which may also lead to a clogging of the micro-pores with the coke, and further, to the destruction of the structure of the zeolite. Since the valence variable metal extinguishes the superfluous strong acid sites participating in the coke formation, among the adsorption sites of hydrocarbons, it can prevent coke formation and thereby prevent a deterioration of the catalyst.

The degree of Cu contained is preferably 5 to 80%, by atom based on Al atoms in the zeolite. When larger than 5%, a required catalytic effect can not be obtained. Since the catalytic active site of the catalyst is Cu, the catalytic performance will be improved with a larger degree of Cu contained, but when 80% or more of Cu is contained, the Cu is susceptible to migration and agglomeration, whereby the heat resistance is lowered.

At least one kind of the valence variable metal is loaded. Examples of the valence variable metal are those having 2 or more valences which are reduced to metals with difficulty, such as Fe, Co, Ni, V, Mn, W, Mo, Cr, Ti, and Nb. The content is preferably 0.01 to 3% by weight based on the zeolite. The effect can be exhibited from 0.01% by weight, but when the content exceeds 3%, a part of the ions and oxides of these metals is consumed by an oxidation of organic compounds into carbon dioxide, and thus the reduction of NOx on Cu is inhibited.

Cu is loaded according to the ion exchange method. This ion exchange is effected through an exchange of $H^+$ or $NH_4^+$ introduced at the ion-exchangeable sites having negative charge in the lattices of the zeolite with Cu ions. Cu ions are employed in the form of a soluble salt, and as the soluble salt, an acetate, nitrate, formate or copper ammine complex can be employed. The Cu ion exchange will be facilitated if the ion exchange is effected in a solution made slightly basic by an addition of ammonia. The pH of the solution is preferably from 9 to 12, because the ratio of cations of Cu relative to the whole cations is high. The valence variable metal may be loaded by either the ion exchange method or the impregnation method, but when a catalyst is prepared by thermal decomposition, it is preferable to effect thermal decomposition at as low a temperature as possible, and to use a substance which does not formate a strongly acidic gas such as an acetate or ammine complex. For both the ion exchange method and the impregnation method, an acetate and nitrate of the valence variable metal may be employed. An example of the ion exchange method, which is the same as for Cu, comprises the ion exchange step of dipping a zeolite in the above salt for one day and night, the drying step of heating the zeolite at a temperature of 100° to 120° C. for about 10 hours, and the calcination step of holding the product at a temperature of 300° to 700° C. for several hours. An example of the impregnation method comprises dipping the zeolite in an aqueous solution of the above salt for 1 to 2 hours, then drying in the atmosphere to load same thereon. The adhesive force is stronger when loaded according to the ion exchange method.

The order in which the Cu and the valence variable metal are loaded is not limited, but when the content of the valence variable metal loaded is much as 0.5% by weight or more, Cu ions cannot be loaded unless the metal is loaded after the Cu ion exchange.

The catalyst having Cu and the valence variable metal loaded thereon may have any shape or structure, such as powder, pellets or a honeycomb shape.

Also, a binder such as alumina sol, silica sol, etc. may be added to a powdery catalyst, and the mixture molded into a desired shape, or formed into a slurry with an addition of water, which may be in turn coated onto a refractory substrate of alumina shaped as a honeycomb.

The catalyst according to the present invention purifies an exhausted gas through the reaction with NOx contained therein.

As organic compounds, hydrocarbons such as unburned olefins and paraffins and oxygen-containing compounds formed by a partial oxidation can be employed. Among these compounds, olefins and oxygen-containing organic compounds having functional groups (e.g., double bond) and having a strong adsorption force are preferred.

The hydrocarbons remaining in the exhausted gas may be used, but when present in an amount less than that necessary for carrying out the reaction, it is preferable to add hydrocarbons to the exhausted gas from an external source.

EXAMPLES

The present invention will now be further illustrated by, but is by no means limited to, the following Examples.

Example 1—1

An aqueous sodium silicate solution ($SiO_2$; 250 g/liter, $Na_2O$; 82 g/liter, $Al_2O_3$; 2.75 g/liter) and an aqueous aluminum sulfate solution ($Al_2O_3$; 8.75 g/liter, $SO_4$; 365 g/liter) were continuously fed, respectively, at flow rates of 1.5 liter/hr and 0.5 liter/hr, while stirring into an overflow type reactor (actual volume, one liter). The apparent residence time of the reaction slurry was 30 minutes, the reaction temperature was 30° to 32° C., and the pH of the slurry was from 6.3 to 6.6. The exhausted slurry was separated into a solid and a liquid, and then washed. The obtained wet cake had the following composition, as represented by the molar ratio of oxides obtained by a chemical analysis:

1.6 $Na_2O.Al_2O_3$.79 $SiO_2$.460 $H_2O$

The thus obtained wet cake (2.89 kg) and 6.11 kg of an aqueous 3.5 wt. % sodium hydroxide NaOH solution were charged into an autoclave and heated at 165° C. for 72 hours to synthesize a zeolite similar to ZSM-5. The zeolite had the following chemical composition, as represented by the molar ratio of oxides in an anhydrous base:

1.1 $Na_2O.Al_2O_3$.43 $SiO_2$ ($SiO_2/Al_2O_3$=43).

The zeolite (1 kg) was added to an aqueous mixed solution of 0.1 mol/liter cerium nitrate and 0.1 mol/liter of copper acetate to one-fold of Cu atoms and 5-fold of Ce atoms relative to Al atoms in the zeolite, and the mixture was stirred at room temperature for 20 hours to effect an ion exchange. After this operation was repeated three times, the mixture was washed and dried to prepare a catalyst No. 1—1.

Also, using La and Nd in place of Ce, catalyst Nos. 1-2 and 1-3 were prepared in the same manner as described above.

The results of chemical analyses of the obtained catalysts are shown in Table 1—1.

TABLE 1-1

| Catalyst | M* | Cu/Al | M/Al |
|---|---|---|---|
| Catalyst 1-1 | Ce | 0.32 | 0.20 |
| Catalyst 1-2 | La | 0.38 | 0.15 |
| Catalyst 1-3 | Nd | 0.38 | 0.13 |

*M represents a rare earth element.

Example 1-2

A mordenite type zeolite was synthesized according to the method of Example 5 of Japanese Unexamined Patent Publication (Kokai) No. 59-735. The zeolite had the following chemical composition, as represented by the molar ratio of oxides in an anhydrous base:

1.1 $Na_2O.Al_2O_3$.17.5 $SiO_2$ ($SiO_2/Al_2O_3$=17.5)

The zeolite (100 g) was added to an aqueous mixed solution of 0.1 mol/liter cerium nitrate and 0.1 mol/liter of copper acetate to one-fold of Cu atoms and 5-fold of Ce atoms relative to Al atoms in the zeolite, and the mixture was stirred at room temperature for 20 hours to effect an ion exchange. After this operation was repeated three times, the mixture was washed and dried to prepare a catalyst No. 1-4. The results of chemical analyses of the obtained catalyst are shown in Table 1-2.

TABLE 1-2

| Catalyst | Cu/Al | Ce/Al |
|---|---|---|
| Catalyst 1-4 | 0.31 | 0.24 |
| Catalyst 1-5 | 0.33 | 0.19 |

Example 1-3

A ferrierite type zeolite was synthesized according to the method of Example 1 of Japanese Unexamined Patent Publication (Kokai) No. 60-141617. The zeolite had the following chemical composition, as represented by the molar ratio of oxides in an anhydrous base:

0.3 $Na_2O \cdot 0.7\ K_2O \cdot Al_2O_3 \cdot 17\ SiO_2$ ($SiO_2/Al_2O_3 = 17$)

The zeolite (100 g) was added to an aqueous mixed solution of 0.1 mol/liter cerium nitrate and 0.1 mol/liter of copper acetate to one-fold of Cu atoms and 5-fold of Ce atoms relative to Al atoms in the zeolite, and the mixture was stirred at room temperature for 20 hours to effect an ion exchange. After this operation was repeated three times, the mixture was washed and dried to prepare a catalyst No. 1-5. The results of chemical analyses of the obtained catalyst are also shown in Table 1-2.

Example 1—4

The same zeolite as used in Example 1—1 (200 g) was added to an aqueous solution of 0.1 mol/liter copper acetate to 1-fold Cu atoms relative to the Al atoms in the zeolite, and the pH was adjusted to 11 by an addition of 2.5% ammonia water. After stirring at room temperature for 20 hours, the mixture was washed and dried to prepare a Cu/zeolite, and as a result of a chemical analysis thereof, the Cu/Al atomic ratio was found to be 0.48.

A 100 g amount of the Cu/zeolite was added to an aqueous 0.1 mol/liter aqueous cerium acetate solution to 0.5-fold Ce atoms relative to the Al atoms in the zeolite, and the mixture was stirred at room temperature for 20 hours to effect an ion exchange. The product was then subjected to solid-liquid separation and drying to prepare a catalyst No. 1-6. As a result of a chemical analysis thereof, the Ce/Al atomic ratio was found to be 0.31.

Example 1-5

The respective catalysts were press molded and crushed, followed by classification with a 42 to 80 mesh. An amount of each of the particles was filled in an atmospheric pressure fixed-bed flow type reaction tube, and a gas simulating the exhausted gas of a lean burning engine (having the gas composition shown in Table 1-3) was made to flow therein at a space velocity of 30000/hr.

TABLE 1-3

| Gas composition | Vol % |
|---|---|
| CO | 0.1 |
| $H_2$ | 0.03 |
| $C_3H_6$ | 0.04 |
| NO | 0.06 |
| $CO_2$ | 10 |
| $H_2O$ | 3 |
| $O_2$ | 4 |
| $N_2$ | balance |

While passing the same gas, a pre-treatment was performed at 500° C. for 30 minutes, cooling to room temperature under the same gas condition followed by a temperature elevation at 5° C./min from room temperature to 600° C., and the conversion activity was measured.

The conversion efficiencies of NO, CO, and $C_3H_6$ at 400° C. are shown in Table 1-4. The conversion efficiencies were determined by measuring each component concentration of the gas after having passed through the catalyst, and calculating same as the conversion efficiencies relative to the gas in Table 1-3.

Also, each catalyst was aged at 700° C. for 5 hours while flowing the gas of the composition in Table 1-3 at a space velocity of 30000/hr. Then, the purification efficiencies were measured according to the same method as described above, to test the durability.

The results are shown in Table 1-4.

TABLE 1-4

| Catalyst | | Conversion efficiency (%) | | |
|---|---|---|---|---|
| | | NO | CO | $C_3H_6$ |
| Catalyst No. 1-1 | Fresh catalyst | 79 | 92 | 95 |
| | Aged catalyst | 56 | 85 | 89 |
| Catalyst No. 1-2 | Fresh catalyst | 78 | 91 | 95 |
| | Aged catalyst | 58 | 88 | 89 |
| Catalyst No. 1-3 | Fresh catalyst | 81 | 91 | 93 |
| | Aged catalyst | 54 | 83 | 85 |
| Catalyst No. 1-4 | Fresh catalyst | 75 | 88 | 90 |
| | Aged catalyst | 48 | 82 | 86 |
| Catalyst No. 1-5 | Fresh catalyst | 77 | 90 | 91 |
| | Aged catalyst | 53 | 87 | 86 |
| Catalyst No. 1-6 | Fresh catalyst | 81 | 93 | 95 |
| | Aged catalyst | 57 | 89 | 88 |
| Comparative catalyst Cl-1 | Fresh catalyst | 53 | 78 | 83 |
| | Aged catalyst | 25 | 41 | 43 |

Comparative Example 1—1

Using the Cu/zeolite (hereinafter referred to as "Comparative catalyst No. Cl-1"), the same performance evaluation tests as in Example 1-5 were performed.

The results are shown in Table 1-4 above.

From the results shown in Table 1-4, when the lower conversion efficiency of the fresh catalyst and the treated catalyst of the Comparative Example are compared, the exhausted gas conversion catalysts of the respective Examples of the present invention have a higher conversion efficiency of the fresh catalyst and aged catalyst, and thus a superior catalyst performance and durability thereof was confirmed.

Example 1-6

One hundred (100) parts by weight of the powder of the catalyst No. Cl-1 obtained in Example 1—1, 20 parts by weight of a silica sol (solids 10%), and 50 parts by weight of water were mixed and stirred to prepare a slurry. The viscosity of the slurry was found to be 250 cps.

The slurry was coated onto the surface of a honeycomb substrate of cordierite with a capacity of 1.7 l and a cell number of about 400, and superfluous slurry was blown off with air. Subsequently, after drying at 100° C. for 3 hours, the product was calcined at 500° C. for 3 hours to prepare a monolith catalyst containing 120 g of a zeolite layer.

The monolith catalyst was mounted on a vessel made of a metal, and then fitted in a lean burn engine exhausting system with an exhausted amount of 1.6 l. The conversion efficiencies of nitrogen oxides (NOx), CO, and hydrocarbons (HC) under simulated urban running conditions were measured.

The average air to fuel ratio was 22, at a maximum temperature of about 750° C. and a test time of 600 hours.

The results are shown in Table 1-5.

TABLE 1-5

|  | Conversion efficiency (%) | | |
| --- | --- | --- | --- |
|  | NOx | CO | $C_3H_6$ |
| Before test | 50 | 78 | 84 |
| After 200 hours | 47 | 65 | 82 |
| After 400 hours | 49 | 63 | 80 |
| After 600 hours | 45 | 62 | 79 |

Comparative Example 1-2

Using the Comparative catalyst (Cu/zeolite) obtained in Example 1-4, a monolith catalyst was prepared in the same manner as in Example 1-6, and the same tests as in Example 1-6 were conducted.

The results are shown in Table 1-6.

TABLE 1-6

|  | Conversion efficiency (%) | | |
| --- | --- | --- | --- |
|  | NOx | CO | $C_3H_6$ |
| Before test | 43 | 63 | 75 |
| After 200 hours | 32 | 58 | 71 |
| After 400 hours | 21 | 55 | 66 |
| After 600 hours | 15 | 53 | 64 |

From the results shown in Table 1-6, the catalyst of Comparative Example had a low conversion efficiency before the test and after 200, 400, 600 hours, but the exhausted gas conversion catalysts of the present invention had a higher purification efficiency before the test and after 200, 400 and 600 hours, whereby the superior performance and durability of the catalyst of the present invention was confirmed.

Example 2-1

Catalysts according to the present invention were prepared, and the conversion activity thereof for NO was evaluated by using a model gas under an oxygen-rich lean condition. The same activity evaluation was performed for the Comparative catalyst.

Preparation of Catalysts of the Present Example (No. 2-1 to 2-9) and Comparative Catalyst (No. C2-1)

An H type ZSM-5 ($SiO_2/Al_2O_3=40$) powder zeolite was dipped overnight in respective aqueous solutions of acetates of Mg, Ca, Sr, and Ba (0.2% by weight as the metal amount) to effect an ion exchange, then washed with water and dried at 100° C. for 3 hours, so that Mg, Ca, Sr and Ba were loaded thereon, respectively. Next, according to the same method as used for the H type ZSM-5, Ca was loaded, by an ion exchange using calcium acetate, on an H type Y zeolite ($SiO_2/Al_2O_3=15$) and H type mordenite ($SiO_2/Al_2O_3=30$) powder. Each sample was dipped in an aqueous Cu ammine complex solution (containing 0.2% by weight of Cu atoms), then subjected to an overnight ion exchange, and further, dried at 100° C. for 3 hours to obtain the catalysts No. 2-1 to 2-6 of the Example having Cu and alkaline earth metals loaded thereon, as shown in Table 2-1. Also, using an H type ZSM-5, a Comparative catalyst No. C2-1 having only Cu loaded thereon was prepared according to the same operation as described above. The amounts of Cu loaded on these catalysts are shown in Table 2-1.

Further, the powders of $NH_4$ type ZSM-5, $NH_4$ type Y zeolite, and $NH_4$ type mordenite were dipped in an aqueous Cu ammine complex solution (containing 0.2% by weight of Cu atoms), respectively, subjected to an overnight ion exchange, washed with dil. ammonia water, and dried at 100° C. for 3 hours. Each of these powders was then dipped in a calcium nitrate solution (containing 1% by weight of Ca atoms) for water absorption so that they loaded Ca by impregnation, whereby the catalysts of the Example (No. 2-7 to 2-9) were obtained. The amounts of Cu and Ca loaded on these catalysts are shown in Table 2-1.

TABLE 2-1

| Catalyst No. | Kind of zeolite | Loading of Cu | | Loading of alkaline earth metal | |
| --- | --- | --- | --- | --- | --- |
|  |  | Content wt % | Ratio to Al % | Content wt % | Ratio to Al % |
| 2-1 | ZSM-5 | 2.4 | 47.2 | Mg: 0.12 | 6.2 |
| 2-2 | ZSM-5 | 3.1 | 61.0 | Ca: 0.25 | 7.8 |
| 2-3 | ZSM-5 | 2.2 | 43.3 | Sr: 0.28 | 4.0 |
| 2-4 | ZSM-5 | 1.6 | 31.5 | Ba: 0.4 | 3.6 |
| 2-5 | Y type | 3.2 | 25.0 | Ca: 0.28 | 3.5 |
| 2-6 | Mordenite | 3.3 | 49.5 | Ca: 0.33 | 7.9 |
| 2-7 | ZSM-5 | 3.4 | 66.9 | Ca: 1.0 | 31.3 |
| 2-8 | Y type | 3.2 | 25.2 | Ca: 1.1 | 13.8 |
| 2-9 | Mordenite | 3.6 | 54.0 | Ca: 1.2 | 28.6 |
| C2-1 | ZSM-5 | 3.5 | 68.9 | — | — |

Catalyst Activity Evaluation

The catalysts No. 2-1 to 2-9 of the present Example and Comparative catalyst No. C2-1 were formed into pellets and were maintained in the model gas shown in Table 2—2, at 800° C. for 5 hours. Then, the NOx conversion efficiency in the model gas shown in Table 2—2 was measured at 400° C. under a steady state, after allowing to stand at 400° C. for several minutes. The results are shown in Table 2-3. As can be seen from Table 2-3, the catalysts No. 2-1 to 2-9 of the present Example have a much greater durability than the Comparative catalyst No. C2-1.

Powders of the catalyst No. 2-2 of the present Example and Comparative catalyst No. C2-1 were then compression molded into pellets about 3 mm$\phi$, and the pellets were subjected to a measurement of NOx conversion characteristics from room temperature to 600° C., using the model gas under an oxygen rich lean condition (air to fuel ratio A/F=18) as shown in Table 2—2. The space velocity was 30,000 hr$^{-1}$ and the temperature elevation rate 10° C./min. The results are shown in FIG. 1. It can be seen from the Figure that the catalyst of the present Example has a superior NOx conversion characteristic at low temperatures of 250° C. or lower and at 400° C. or higher. The conversion efficiencies of CO and $C_3H_6$ are also shown in Table 2-3.

TABLE 2-2

| Model gas composition (Vol %) | |
| --- | --- |
| CO | 0.1 |
| $H_2$ | 0.033 |
| $C_3H_6$ | 0.04 |
| NO | 0.05 |
| $NO_2$ | 0.017 |
| $O_2$ | 4.0 |
| $CO_2$ | 10.0 |
| $H_2O$ | 3.0 |

TABLE 2-2-continued

| Model gas composition (Vol %) | |
|---|---|
| N₂ | Balance |

TABLE 2-3

| Catalyst No. | Conversion efficiency | | |
|---|---|---|---|
| | NOx (%) | CO (%) | C₃H₆ (%) |
| 2-1 | 40 | 80 | 85 |
| 2-2 | 52 | 84 | 87 |
| 2-3 | 44 | 83 | 86 |
| 2-4 | 45 | 81 | 82 |
| 2-5 | 33 | 73 | 74 |
| 2-6 | 44 | 79 | 82 |
| 2-7 | 54 | 83 | 88 |
| 2-8 | 43 | 77 | 85 |
| 2-9 | 35 | 76 | 79 |
| C2-1 | 25 | 41 | 44 |

Example 2—2 the durability of the catalyst according to the present invention while driving an automobile in an urban district was evaluated.

The each powder (500 g) of the catalyst No. 2—2 and No. C2-1 shown in Table 2-1 was mixed, while stirring, with 700 g of a silica sol (10% by weight of $SiO_2$) and 100 g of pure water, the mixture was adjusted to a pH of 10 to 11 with ammonia water, to obtain a slurry for coating, and the slurry was coated onto a 0.7 liter cordierite honeycomb carrier at 120 g/liter. The carrier coated with the catalyst No. 2—2 is the catalyst No. 2-10 catalyst of the present Example, and the carrier coated with No. C2-1 is the Comparative Example No. C2-2.

The initial catalytic activity and durability of these catalysts were evaluated under actual driving conditions.

Durability Test Conditions

The catalyst No. 2-10 of the present Example and the Comparative catalyst No. C2-2 were each mounted in an engine gas exhausting system of a car having a weight of 1 ton and a 1600 cc lean burning engine, and the car was run under conditions simulating a running of the vehicle in urban district, wherein the inlet gas temperature was about 800° C. at a maximum after 1000 km and 30,000 km.

NOx Conversion Efficiency Measurement

The NOx conversion efficiency was measured at an average air to fuel ratio of 22 and an inlet gas temperature of 400° C., for the above-mentioned engine. The results are shown in Table 2-4.

TABLE 2-4

| Catalyst No. | NOx conversion efficiency (%) | | |
|---|---|---|---|
| | Before durability test | After 1,000 km running | After 30,000 km running |
| 2-10 | 55 | 53 | 55 |
| C2-2 | 59 | 59 | 20 |

Although the H type ZSM-5 having only Cu contained therein is durable to some extent, but it can be appreciated that the H type ZSM-5 having Cu and Ca contained in combination therein has a superior durability thereto.

Example 3-1

Catalysts according to the present invention were prepared, NO purification activity of said catalysts was evaluated by using a model gas under the lean condition in an oxygen rich atmosphere. Also, the same activity evaluation was performed for the Comparative catalyst.

Preparation of Catalysts of the Present Example (No. 3-1 to 3-7) and Comparative Catalysts (No. C3-1 and C3-2)

An H type ZSM-5 ($SiO_2/Al_2O_3=40$) powder, which is a zeolite, was dipped in a mixed aqueous solution of the acetates of Cu+Ba+Y (No. 3-1), Cu+Mg+Y (No. 3-2), Cu+Ca+Y (No. 3-3), Cu+Ba+La (4 levels of La concentration, No. 3-4 to 3-7) for 15 minutes, and then dried at 110° C. for 1 hours. Then, the dried product was calcined at 500° C. for 3 hours to give the catalysts of Example (No. 3-1 to 3-7). A Comparative catalyst was prepared by dipping the above-mentioned zeolite overnight in an aqueous Cu acetate solution (0.1 mol/liter) to effect ion an exchange to provide the Comparative catalyst No. C3-1, and the catalyst obtained by effecting an ion exchange of Cu, washing with water, and drying the product at 110° C. for 10 hours, followed by loading Ba according to the same impregnation method as described above, is made Comparative catalyst No. C3-2.

The catalyst composition and content are shown in Table 3-1.

TABLE 3-1

| Catalyst No. | Catalyst composition and loading content (wt %) |
|---|---|
| 3-1 | Cu (3) + Ba (2) + Y (1) |
| 3-2 | Cu (3) + Mg (2) + Y (1) |
| 3-3 | Cu (3) + Ca (2) + Y (1) |
| 3-4 | Cu (3) + Ba (2) + La (1) |
| 3-5 | Cu (3) + Ba (2) + La (10) |
| 3-6 | Cu (3) + Ba (2) + La (15) |
| 3-7 | Cu (3) + Ba (2) + La (20) |
| C3-1 | Cu (3) |
| C3-2 | Cu (3) + Ba (2) |

Catalyst Activity Evaluation

The catalysts No. 3-1 to 3-7 of the present Example and Comparative catalyst C3-1 and C3-2 were formed into pellets and were maintained in the model gas simulating the exhausted gas from an automobile as shown in Table 3-2, at 800° C. for 5 hours. Then, the NOx conversion efficiency in the model gas shown in Table 3-2 was measured at 400° C. under a steady state after allowing to stand at 400° C. for several minutes, and the results are shown in Table 3—3. It is clear that the catalysts No. 3-1 to 3-7 of the present Example have a superior durability compared with the Comparative catalysts.

The conversion efficiencies of CO and $C_3H_6$ are also shown in Table 3—3.

TABLE 3-2

| Model gas composition (Vol %) | |
|---|---|
| CO | 0.1 |
| H₂ | 0.033 |
| C₃H₆ | 0.04 |
| NO | 0.05 |
| NO₂ | 0.017 |
| O₂ | 4.0 |
| CO₂ | 10.3 |
| H₂O | 3.0 |

TABLE 3-2-continued

| Model gas composition (Vol %) | |
|---|---|
| N₂ | Balance |

TABLE 3-3

| Catalyst No. | Conversion efficiency | | |
|---|---|---|---|
| | NOx (%) | CO (%) | C₃H₆ (%) |
| 3-1 | 46 | 84 | 89 |
| 3-2 | 45 | 82 | 87 |
| 3-3 | 48 | 86 | 87 |
| 3-4 | 50 | 88 | 89 |
| 3-5 | 48 | 87 | 90 |
| 3-6 | 40 | 79 | 83 |
| 3-7 | 37 | 76 | 85 |
| C3-1 | 35 | 76 | 84 |
| C3-2 | 30 | 72 | 80 |

Example 3-2

The durability of the catalyst according to the present invention, while running under urban district conditions, was evaluated.

The each powder (500 g) of the catalyst No. 3-4 shown in Table 3-1 and No. C3-1 and C3-2 was mixed while stirring with 700 g of a silica sol (10% by weight of SiO₂) and 100 g of pure water, the mixture was adjusted to a pH of 10 to 11 with ammonia water to obtain a slurry for coating, and said slurry was coated onto 0.7 liter of a cordierite honeycomb carrier at 120 g/liter. The carrier coated with the catalyst No. 3-4 is the catalyst No. 3-8 of the present Example, the carrier coated with No. C3-1 is Comparative catalyst No. C3-3, and the carrier coated with No. C3-2 is Comparative catalyst No. C3-4.

The initial catalytic activity and durability of these catalysts were evaluated under actual running conditions.

Durability Test Conditions

The catalyst No. 8 of the present Example and Comparative catalysts No. C3-3 and C3-4 were each mounted on the engine gas exhausting system of a car with a car weight of 1 ton having a 1600 cc lean burn engine, and the car was run under conditions simulating running in urban district where the inlet gas temperature became about 800° C. at maximum after 1000 km and 30,000 km.

NOx Conversion Efficiency Measurement

The NOx conversion efficiency was measured at an average air to fuel ratio of 22 and an inlet gas temperature of 400° C. of the above-mentioned engine. The results are shown in Table 3-4.

TABLE 3-4

| Catalyst No. | NOx conversion efficiency (%) | | |
|---|---|---|---|
| | Before durability test | After 1,000 km running | After 30,000 km running |
| 3-8 | 68 | 66 | 67 |
| C3-3 | 53 | 51 | 49 |
| C3-4 | 40 | 38 | 36 |

Although the H type ZSM-5 having Cu+Ba loaded thereon has a durability to some extent, it can be appreciated that the H type ZSM-5 having Cu+Ca+La loaded in combination thereon has a superior durability.

Examples 4-1 to 4-16 and Comparative Example 4-1

Catalysts according to the present invention were prepared, and the conversion activity for NO thereof evaluated by using a model gas under the lean condition in an oxygen rich atmosphere. Also, the same activity evaluation was performed for the Comparative catalyst.

Preparation of Catalysts of the Present Example (No. 4-1 to 4-16) and Comparative Catalyst (No. C4-1)

An H type ZSM-5 (SiO₂/Al₂O₃=40) powder zeolite was prepared, and Cu was first loaded on the zeolite.

The ion exchange was carried out by dipping the zeolite in an aqueous tetra-ammine copper ion ($Cu(NH_3)_4^{2+}$) solution overnight. After the ion exchange, the zeolite was washed with water, and dried by heating in air at 100° C. for 5 hours, to give a zeolite catalyst having Cu contained therein (Comparative catalyst No. C4-1).

The above zeolite catalyst having Cu contained therein was immersed in an aqueous solution of each of ferric nitrate, cobalt nitrate, nickel nitrate, ammonium metavanadate, manganese nitrate, ammonium tungstate, ammonium molybdenate, ammonium chromate, titanium trichloride, and niobium trichloride, to impregnate the catalyst with 0.1% by weight of each component as calculated on metal. Then, the nitrate salts or ammonium salts were pyrolyzed in air at 300° C., and thereafter, the pyrolyzed products were washed with 1% ammonia water, followed by the removal of superfluous ions such as chloride ions. Further, the products were dried in air at 100° C. to give zeolites having 0.1% by weight of Fe, Co, and Ni loaded thereon in addition to Cu (catalysts No. 4-1 to 4-10 of the present Example).

The Comparative catalyst No. C4-1 having only Cu contained therein was treated according to the impregnation method to prepare catalyst Nos. 4-11, 4-12 and 4-15 of the present Example having 0.5, 1 and 3% by weight of Fe loaded thereon. Similarly, catalysts No. 4-13, 4-14 and 4-16 of the present Example having 0.5, 1 and 3% by weight of Cr loaded thereon were prepared.

Purification Activity Evaluation

The present Example catalysts No. 4-1 to 4-16 and Comparative Example No. C4-1 were formed into pellets, and the NO conversion efficiency thereof at 400° C. under a steady state was determined in a model gas A comprising a gas composition (vol. %) of NO: 0.067; C₃H₆: 0.04, CO: 0.1, H₂: 0.033, O₂: 4.0, CO₂: 10.0, H₂O: 3.0, N₂ the balance being in a lean state in an oxygen rich atmosphere corresponding to an air to fuel ratio (A/F) of 18), and in a model gas B of the same composition as said gas A except for replacing C₃H₆ with 0.025 vol. % of i-octane (C₈H₁₈) Next, heating treatments were conducted in the above-mentioned model gas atmosphere at 700° C. for 5 hours, for an evaluation of the durability. The space velocity of the above-mentioned gas during activity evaluation was 30,000 hr⁻¹.

Table 4-1 (when using model gas A) and Table 4-2 (when using model gas B) show the NO conversion efficiency of the respective catalyst at the initial stage and after the durability test.

It can be appreciated that the catalysts according to the present Example show a superior initial performance and durability at 700° C., compared with the Comparative catalyst. Also, from the results in Table 4-2, it is clear that the catalysts according to the present Example show excellent activities when using paraffinic saturated hydrocarbons.

The conversion efficiencies of CO and hydrocarbon are also shown in Table 4-1.

TABLE 4-1

| Catalyst No. | Content (wt %) | | Conversion efficiency | | | |
|---|---|---|---|---|---|---|
| | Cu | Metal other than Cu | NO (%) Initial perfor- mance | NO (%) After durability test | CO (%) After durability test | HC (%) After durability test |
| Example | | | | | | |
| 4-1 | 2.8 | Fe 0.1 | 83 | 62 | 89 | 90 |
| 4-2 | 2.8 | Co 0.1 | 92 | 57 | 87 | 91 |
| 4-3 | 2.8 | Ni 0.1 | 79 | 60 | 91 | 92 |
| 4-4 | 2.8 | V 0.1 | 67 | 54 | 85 | 88 |
| 4-5 | 2.8 | Mn 0.1 | 86 | 63 | 89 | 90 |
| 4-6 | 2.8 | W 0.1 | 65 | 48 | 76 | 84 |
| 4-7 | 2.8 | Mo 0.1 | 67 | 51 | 79 | 88 |
| 4-8 | 2.8 | Cr 0.1 | 78 | 60 | 89 | 92 |
| 4-9 | 2.8 | Ti 0.1 | 62 | 45 | 79 | 84 |
| 4-10 | 2.8 | Nb 0.1 | 60 | 41 | 76 | 82 |
| 4-11 | 2.8 | Fe 0.5 | 90 | 72 | 93 | 95 |
| 4-12 | 2.8 | Fe 1.0 | 83 | 62 | 89 | 91 |
| 4-13 | 2.8 | Cr 0.5 | 75 | 62 | 88 | 93 |
| 4-14 | 2.8 | Cr 1.0 | 63 | 51 | 72 | 85 |
| 4-15 | 2.8 | Fe 3.0 | 70 | 25 | 62 | 74 |
| 4-16 | 2.8 | Cr 3.0 | 60 | 32 | 68 | 72 |
| Comparative Example | | | | | | |
| C4-1 | 2.8 | — | 53 | 12 | 56 | 68 |

TABLE 4-2

| Catalyst No. | Content (wt %) | | NO Conversion efficiency (%) | |
|---|---|---|---|---|
| | Cu | Metal other than Cu | Initial performance | After durability test |
| Example | | | | |
| 4-1 | 2.8 | Fe 0.1 | 52 | 40 |
| 4-2 | 2.8 | Co 0.1 | 48 | 38 |
| 4-3 | 2.8 | Ni 0.1 | 58 | 44 |
| 4-4 | 2.8 | V 0.1 | 54 | 40 |
| 4-5 | 2.8 | Mn 0.1 | 59 | 46 |
| 4-6 | 2.8 | W 0.1 | 43 | 35 |
| 4-7 | 2.8 | Mo 0.1 | 46 | 32 |
| 4-8 | 2.8 | Cu 0.1 | 60 | 48 |
| 4-9 | 2.8 | Ti 0.1 | 40 | 28 |
| 4-10 | 2.8 | Nb 0.1 | 39 | 25 |
| 4-11 | 2.8 | Fe 0.5 | 59 | 43 |
| 4-12 | 2.8 | Fe 1.0 | 55 | 42 |
| 4-13 | 2.8 | Cr 0.5 | 62 | 51 |
| 4-14 | 2.8 | Cr 1.0 | 54 | 40 |
| 4-15 | 2.8 | Fe 3.0 | 43 | 16 |
| 4-16 | 2.8 | Cr 3.0 | 36 | 12 |
| Comparative Example | | | | |
| C4-1 | 2.8 | — | 6 | 2 |

We claim:

1. A method of purifying an exhaust gas containing an excess amount of oxygen, which comprises bringing a catalyst into contact with the exhaust gas to remove nitrogen oxides, carbon monoxide and hydrocarbons from the exhaust gas, the catalyst comprising:
   (i) a zeolite having a molar ratio of $SiO_2/Al_2O_3$ of at least 10; and
   (ii) at least one copper ion and at least one kind of rare earth ion loaded thereon.

2. The method as claimed in claim 1, wherein said rare earth ion is selected from the group consisting of La, Ce, Pr, Nd, Pm, and Sm.

3. The method as claimed in claim 1, wherein the amount of the copper ion is 0.01 to 1 in terms of a Cu/Al atomic ratio.

4. The method as claimed in claim 1, wherein the amount of the rare earth ion is at least 0.01 in terms of a rare earth ion/Al atomic ratio.

5. A method of purifying an exhaust gas containing an excess amount of oxygen, which comprises bringing a catalyst into contact with the exhaust gas in the presence of an organic compound to remove nitrogen oxides, carbon monoxide and hydrocarbons from the exhaust gas, the catalyst comprising:
   (i) a zeolite having a molar ratio of $SiO_2/Al_2O_3$ of at least 10; and
   (ii) at least one copper ion and at least one kind of alkaline earth metal loaded thereon.

6. The method as claimed in claim 5, wherein said alkaline earth metal is at least one kind of metal selected from the group consisting of magnesium, calcium, strontium, and barium.

7. The method as claimed in claim 5, wherein the amount of the copper ion is 5% to 80%, in terms of atomic ratio, based upon the atom of Al in the zeolite.

8. The method as claimed in claim 5, wherein the amount of the alkaline earth metal is 0.1% to 10% by weight based upon the weight of the zeolite.

9. The method as claimed in claim 2, wherein the catalyst further comprises at least one kind of rare earth ion loaded on the zeolite.

10. The method as claimed in claim 9, wherein the amounts of the copper ion, the alkaline earth metal, and the rare earth ion are 5% to 80%, in terms of atomic ratio, based upon the aluminum atom in the zeolite, 0.05% to 2% by weight based upon the weight of the zeolite, and 0.1% to 10% by weight based upon the weight of the zeolite, respectively.

11. A method of purifying an exhaust gas containing an excess amount of oxygen, which comprises bringing a catalyst into contact with the exhaust gas in the presence of an organic compound to remove nitrogen oxides, carbon monoxide and hydrocarbons from an exhaust gas, the catalyst comprising:
   (i) a zeolite having a molar ratio of $SiO_2/Al_2O_3$ of at least 10; and
   (ii) at least one copper ion and at least one kind of valence variable metal loaded thereon.

12. The method as claimed in claim 2, wherein said valence variable metal is at least one kind of metal selected from the group consisting of Fe, Co, Ni, V, Mn, W, Mo, Cr, Ti, and Nb.

13. The method as claimed in claim 12, wherein the amounts of the copper ion and the valence variable metal are 5% to 80%, in terms of atomic ratio, based upon the aluminum atom in the zeolite and 0.01% to 3% by weight based upon the weight of the zeolite.

* * * * *